United States Patent [19]

Worsham

[11] E Re. 30,073

[45] Reissued Aug. 14, 1979

[54] CONTROLLABLE STUNT KITE HAVING A PAIR OF SYMMETRICAL BRIDLES

[76] Inventor: Lynn M. Worsham, 1908 Arctic St., San Leandro, Calif. 94577

[21] Appl. No.: 809,405

[22] Filed: Jun. 23, 1977

Related U.S. Patent Documents

Reissue of:

[64] Patent No.: 3,994,454
Issued: Nov. 30, 1976
Appl. No.: 640,427
Filed: Dec. 15, 1975

[51] Int. Cl.[2] ..... B64C 31/06
[52] U.S. Cl. ..... 244/153 R
[58] Field of Search ..... 244/153 R, 154, 155 R; D34/15 AF; 40/215

[56] References Cited

U.S. PATENT DOCUMENTS

| | | | |
|---|---|---|---|
| 490,949 | 1/1893 | Davis | 244/153 R |
| 1,009,274 | 11/1911 | Ayling | 244/153 R |
| 1,782,858 | 11/1930 | Nagy | 244/153 R |
| 1,814,811 | 7/1931 | Kramer et al. | 244/153 R |
| 2,203,623 | 6/1940 | Wiemer | 40/215 |
| 2,484,096 | 10/1949 | Kay | 244/153 R |
| 2,546,078 | 3/1951 | Rogallo et al. | 244/153 R |
| 3,327,975 | 6/1967 | Vaughan | 244/153 R |
| 3,347,500 | 10/1967 | Hartig | 244/153 R |
| 3,514,059 | 5/1970 | Aalto | 244/153 R |

OTHER PUBLICATIONS

"Secrets of Making and Flying Chinese Kites", *Popular Science,* vol. 176, No. 4, Apr. 1960, pp. 178-182.

*Primary Examiner*—Barry L. Kelmachter
*Attorney, Agent, or Firm*—Robert W. Keller

[57] ABSTRACT

A stunt kite comprising a first horizontal spar member, a second vertical spline member, third and fourth diagonal spar members, the members being formed into a fixed frame, a covering disposed on the frame and having a lateral dimension which is greater than its dimension corresponding to its longitudinal axis and being symmetrical in shape about the longitudinal axis, [a bow string forming the first member into a bowed shape such that the covering is bowed into a generally convex configuration,] a pair of bridles each symmetrically connected between the third and fourth members on opposed sides of the second member and extending outside the covering, the substantial midpoint of each bridle forming an attachment point which lies a predetermined distance above the center of gravity of the kite, and first and second tails connected to the bottom ends of the third and fourth members, respectively, for providing substantially equal stabilizing drag forces at the bottom corners of the covering, such that when lengths of line are connected to the attachment points the flight pattern of the kite is capable of being precisely controlled.

13 Claims, 8 Drawing Figures

CONTROLLABLE STUNT KITE HAVING A PAIR OF SYMMETRICAL BRIDLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to kites, and more particularly to a controllable stunt kite having a pair of symmetrical bridles.

2. Description of the Prior Art

Today more than 40 million kites are marketed in the United States yearly, most of them selling for under a dollar in dime stores and supermarkets. However, recent trends indicate that the market for kites costing upwards of $2.00 is increasing.

Kites are believed to have originated in China well over three thousand years ago, were used in Malayan religious observances about 3,000 year ago and have been found in legends regarding tethered flight in 2,500 year old Egyptian hieroglyphics. Assuming that kites had been known for a long time being they became a part of folklore, religion or legend, it seems reasonable to believe that kites date to the beginnings of human cultures.

The earliest kites are believed to be fabricated from large leaves of semitropical plants flown from lines made of twisted vines. Since even in those early cultures it was known that things did not naturally float in the air, the apparent miracle of a big leaf supported in the air at the end of a long stem could easily have been interpreted as magic. Such an interpretation could easily account for the wide variety of shapes and sizes that kites have assumed. Generally, however, kites fall into these basic types; flat kites, bowed kites, box kites, semirigid kites, and nonrigid kites. Even with this vast variation in kite size, shape and style, few kites are known to be controllable to any great extent.

As an example of a controllable kite, it is recognized that during World War II, a target kite was developed by the United States Navy for providing gunners with a constantly moving target. Such a kite was a basic two-stick kite including a keel and a rudder which were controlled and made movable relative to the covering through an elaborate system comprising a pulley, a bell crank and a control horn. These elements were interconnected in such a manner so as to enable the kite to be controlled by twin flying lines. A primary disadvantage of such a structure is its complexity. Furthermore, in spite of the elaborate structure for moving the rudder and the keel, it is believed that the kite could not be precisely controlled during flight.

SUMMARY OF THE PRESENT INVENTION

It is therefore a primary object of the present invention to provide a kite which is capable of performing acrobatics and stunts in flight in a predictable and controlled manner.

Another object of the present invention is to provide a kite which is able to fly horizontally, make vertical dives and to gently land.

Still another object of the present invention is to provide a kite having a simple, fixed frame and having no moving parts.

Briefly, the preferred embodiment of the present invention includes a first spar member, a second spline member disposed substantially normal to the first member, third and fourth spar members disposed diagonally relative to the first and second members and intersecting at the second member, the members being formed into a fixed frame, a covering disposed on the frame and having an outer surface and a longitudinal axis in alignment with the second member, the outer surface having a lateral dimension which is greater than its dimension corresponding to its longitudinal axis and being symmetrical in shape about the longitudinal axis, [a string forming the first member into a bowed shape such that the covering is bowed into a generally convex configuration,] a pair of bridles each symmetrically connected between the third and fourth members on opposed sides of the second member and extending outside the outer surface, the substantial midpoint of each bridle forming an attachment point which lies a predetermined distance above the center of gravity of the kite, and first and second tails connected to the third and fourth members, respectively, proximate the respective bottom ends thereof for providing substantially equal stabilizing drag forces at the bottom corners of the covering, such that when lengths of line are connected to the attachment points, the flight pattern of the kite is capable of being precisely controlled.

An advantage of the present invention is that it is precisely controllable and is able to perform acrobatics and stunts during flight.

Another advantage of the present invention is that the stunt kite is capable of being flown in a horizontal plane, is capable of making vertical dives, is capable of landing gently and is capable of performing almost any known acrobatic pattern such as figure eights in either direction.

Still another advantage of the present invention is that it is simply fabricated and includes no moving parts.

Yet another advantage of the present invention is that it is relatively simple to learn to fly and can be safely flown by children.

These and other objects and advantages of the present invention will no doubt become apparent following a reading of the Detailed Description of the Preferred Embodiments which are illustrated in the several figures of the drawing.

IN THE DRAWING

DETAILED DESCRIPTION OF THE PREFERRED EMBODIMENT

Figure 1:
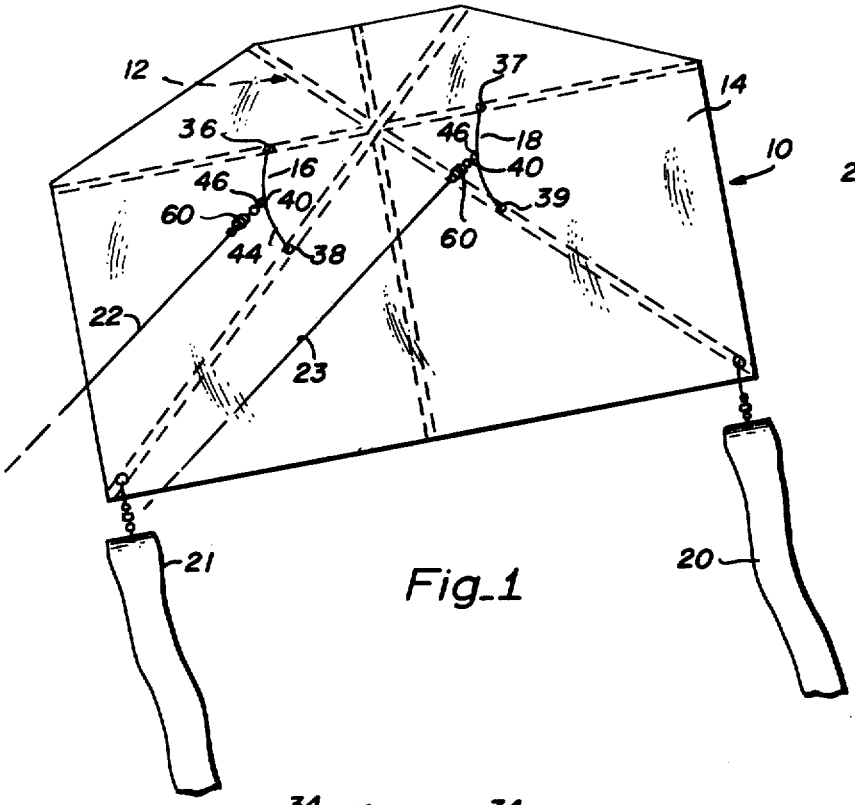
FIG. 1 is a perspective view of the stunt kite in accordance with the present invention.

Referring now to the drawings and more particularly to FIG. 1 thereof, a stunt kite, generally illustrated by the numeral 10, is illustrated in perspective view. The stunt kite includes a fixed frame 12 (shown in dashed lines), a covering 14 disposed over the frame, a pair of symmetrical bridles 16 and 18, tails 20 and 21, and control lines 22 and 23.

Figure 2:
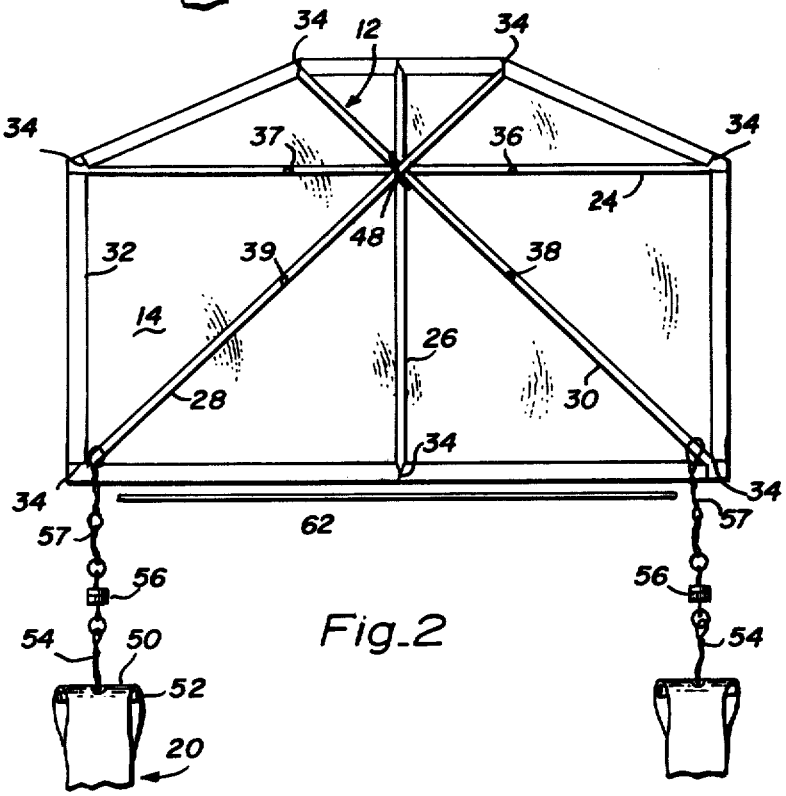
FIG. 2 is a rear elevational view of the several components of the stunt kite prior to being formed into the kite in accordance with the present invention.

With reference also to FIG. 2, the frame 12 is comprised of a horizontal spar 24, a vertical spline 26, or power strut, and diagonal spars 28 and 30, such spars and spline being elongated members having grooved ends and commonly referred to as "sticks."

In the preferred embodiment, the length of the horizontal spar 24 is 25¼ inches, the length of the diagonal spars is 24⅞ inches and the length of the vertical spar is 19 inches, each of the members having a rectangular cross section eleven thirty-seconds inches by one-eighth inches, and being comprised of wood such as pine, cypress, spruce, etc. Alternatively, the members are fabricated from plastic having a high impact resistance, nylon or bamboo.

The covering 14, or skin, is comprised of a sheet of material having an inner surface 31, an outer surface 33 and a six-sided shape that generally resembles a blunt home-plate with parallel top and bottom edges and parallel side edges. The covering 14 is symmetrical relative to a longitudinal or vertical axis and has a width or lateral dimension greater than its height, or dimension along the longitudinal axis. Hence, the center of gravity of the covering lies on the longitudinal axis at a point below the top corner of the side edges.

An outline string 32 is disposed around the border of the covering 14 as shown in FIG. 2 and the border is cut as at 34. An adhesive is applied to such border so that when the borders are folded along the cuts 34, the outline string is exposed in eight regions in a manner that enables it to be received within the grooves of the members 24–30. In addition, four apertures 36–39 are formed through predetermined locations in the covering 14 as will be next described. The apertures 36–37 lie on an imaginary line corresponding to the position on the horizontal spar 24 and are spaced laterally equidistant from a longitudinal axis of the covering which corresponds to the position of the vertical spline 26. Similarly, the apertures 38–39 lie on an imaginary line parallel to the line on which the apertures 36–37 lie such that the apertures 38–39 are the identical distance from the longitudinal axis as are the apertures 36–37 and overlay the diagonal spars 28 and 30. The apertures 36–39 serve to receive the ends of the bridles 16 and 18 while allowing the bridles 16 and 18 to be disposed outside the outer surface 33 of the kite.

The accurate positioning of the apertures 36–39 is very important to the present invention since the exact location of the bridles 16 and 18 is important in terms of predicting how the kite will fly. From a trial-and-error test, it has been found that if the bridles are too close to the longitudinal axis of the covering, the kite tends to spin in flight. Moreover, if the bridles are too far from the longitudinal axis then the kite is not able to be controlled by a human operator in that it requires the two control lines to be separated by a distance greater than a human arm span in order to provide the required moment on the kite during flight.

In the preferred embodiment the covering is formed from a sheet of plastic having a thickness of about 1.2 mils. Alternatively, the covering may be formed from sheets of paper, mylar or lightweight strong cloth having a very tight weave. Also, in the preferred embodiment the bottom edge has a dimension of 26¼ inches, the top edge has a dimension of 9 inches, the longitudinal axis has a dimension of 19 inches, the perpendicular distance from the longitudinal axis to the apertures 36–39 is 5⅝ inches and the vertical distance between the apertures 36 and 38, and 37 and 39 is 5 inches.

Figure 3:
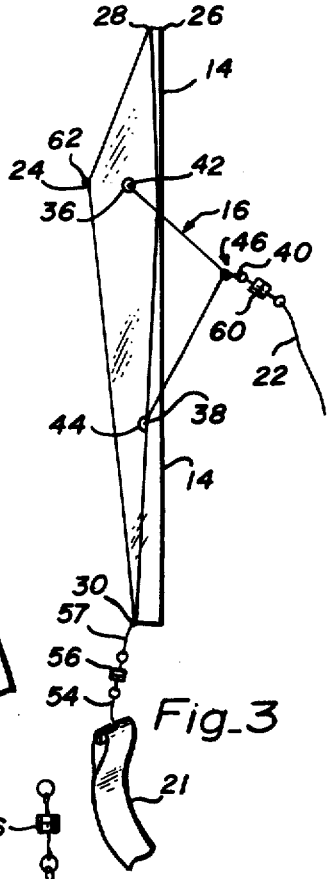
FIG. 3 is a perspective view of a bowed kite showing the bridle.

The bridles 16 and 18 are comprised of a length of string formed into an endless loop. With reference also to FIG. 3, the loop is folded into exactly equal portions and tied with an overhand knot such that an attachment point 40 is formed substantially at the midpoint of the loop. As shown, each bridle is V-shaped and includes ends 42 and 44 and an attachment portion 46. In accordance with the present invention the attachment points 40 lie parallel to the longitudinal axis above the center of gravity of the covering 14 a distance corresponding to about 10 percent of the height of the covering. In the preferred embodiment the attachment points 40 are located 2⅞ inches below and 2 to 3 inches in front of the apertures 36–37. Alternatively, the attachment points may lie a distance between 7 and 15 percent above the center of gravity.

In order to assemble the members into the frame 12 and the covering 14 to the frame 12, the ends 42 of the bridles 16 and 18 are affixed to the spar 24 with loop knots a predetermined distance from its midpoint, such distance corresponding with the location of the apertures 36 and 37. Thereafter, the horizontal spar 24 is placed against the back surface of the covering 14, its grooved ends inserted into the outline string 32, and the bridles are pulled through the apertures 36 and 37, respectively. Next, the spline 26 is positioned between the covering and the spar 24 and normal to the spar and its grooved ends inserted into the outline string 32.

Thereafter, the diagonal spar 28 is slid through a loop knot formed in the end 44 of the bridle 18, over the spar 24 and its grooved ends inserted into the outline string 32. Similarly, the diagonal spar 30 is slid through a loop knot formed in the end 44 of the bridle 16 and its grooved ends inserted into the outline string 32. As shown in FIG. 2, the top ends of the members 26, 28 and 30, and the bottom ends of the members each lie on a line substantially parallel to the spar 24 and all members intersect at a common point 48. A string (not shown) is tied around the members at the point 48 and serves to secure the members onto a fixed frame configuration. Next, the covering is smoothed, and the loop knots formed in the ends 42 and 44 of the bridles 15 and 18 are tightened, thus forming the frame 12 and covering 14 into an integral structure.

Figure 4:
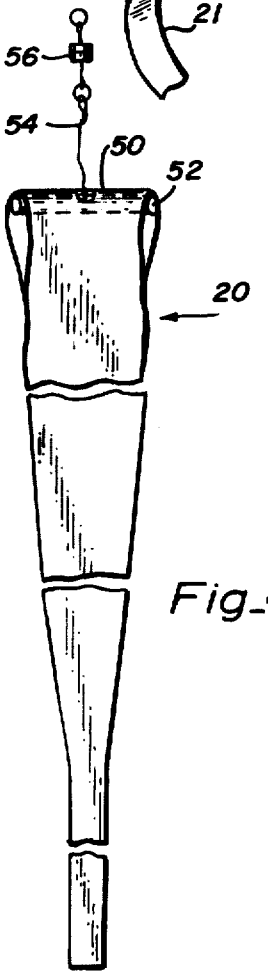
FIG. 4 is a plan view of a tail.

Referring also to FIG. 4, the tail 20 is illustrated, it being understood that the tail 21 is identical to the tail 21.

The tail 20 is formed from an elongated length of material and includes an end 50 formed into a loop and having an aperture therethrough. A rod 52, or stick, having a string 54 tied proximate its midpoint is inserted through the end 50 with the string 54 extending through the aperture. The string 54 is connected to an end of a snap swivel 56 and serves to connect the tail 20 to the frame 12. The snap swivel 56 is of a conventional type, commonly used by fishermen, and serves to prevent a twist in a line connected to one of its ends from effecting a line tied to its other end. A tail string 57 in the form of an endless loop is connected with a loop knot to the bottom end of the diagonal spar 30. When the opposite end of the snap swivel 56 is attached to the string 54, the tail 20 is connected to the frame 12. The tails 20 and 21 serve to provide equal stabilizing drag forces at the respective bottom outside edges of the covering 14.

In the preferred embodiment, the tail 20 is formed from a sheet of plastic having a length of about 130 feet, and a thickness of 1.2 mils. The sheet is 2½ inches in width for a distance of 18 feet and then is uniformly tapered over the next 12 feet to a width of three-fourths inches. The last 100 feet of plastic are maintained at this constant width (three-fourths inches). It has been found that long, ribbon-type tails enhance the ornamental qualities of the patterns produced by the kite in flight. In alternative embodiments, the tail is formed of mylar or cloth and may have a length between 6 and 20 feet. The tail strings 57 are preferably about 12¼ inches in circumference.

In yet anothr alternative embodiment, a single tail 20 is attached to the kite with a bridle having its opposed ends affixed to the bottom ends of the diagonal spars. The length of the bridle is such that its attachment point to which the tail is attached, is at least 18 inches below the bottom corners of the kite. It has been found that the single tail provides sufficient corner drag to generally control the kite during flight. However, since there is some loss of corner drag when a single tail is used, sharp turns should be avoided.

The control lines 22 and 23 are connected to the attachment points 40 of the respective bridles 16 and 18 with snap swivels 60. In the preferred embodiment the control lines 22 and 23 are comprised of a nylon monofiliament line having at least a 20-pound strength, such as those commonly used in fishing and are tied to the snap swivels 60 with three or more figure eight knots to prevent slippage of the nylon from the swivel. As will be subsequently described, since it is necessary to trim the lines during flight, the elastic properties of nylon make it best suited for use in winds of varying intensity. The opposed end of the control lines are tied to control handles or dowels (not shown) which are about 1 inch in diameter and have a length of about 5 inches.

It should be recognized that the length of the control line is not critical and that a line having a length between 75 feet and 1500 feet may be used. It has been found that control lines having a 20-pound strength are best suited for use when the wind is between 7–15 miles per hour, that lines having a 25-pound strength are best in winds between 12–25 miles per hour, and that lines having a 30-pound strength are best in winds between 25–45 miles per hour.

In operation, the covering 14 is laid with the tails 20 and 21 spread out behind the kite and secured to the bottom ends of the diagonal spars 30 and 28, respectively, with the snap swivels 56, and with the control lines 22 and 23 laid on the ground in front of the kite to assure that the lines do not have any twists. Next, the horizontal spar 24 is bowed and secured in such bowed shape with a back band bow string 62. Hence, the back band bow string 62 serves to form the frame and thus the covering 14 into a generally convex configuration. It should be noted that the spar 24 should have a bow (distance between the spar 24 and the covering 14) between 2½ and 3 inches. The bow serves to prevent the kite from going over the flyer during flight and to minimize the possibility of flat spins.

The control lines 22 and 23 are then connected with the snap swivels 60 to the attachment portions 46 of the bridles 16 and 18.

While one person holds the stunt kite, the flyer picks up the control handles and stands with the wind at his back. Initially the control lines 22 and 23 should have substantially equal lengths. As the holder backs away from the kite and releases the kite, the kite will fly up.

As described, the stunt kite will "fly in a straight line" when both control lines are the same length. It should be noted that the term fly in a straight line means the direction the kite is traveling when it finishes a turn. In flight, should the kite move to the right, the left control line should be pulled towards the flyer until the kite straightens its direction of travel. Conversely, should the kite move to the left, the right line should be pulled in until the kite straightens it pattern.

Hence, when the right control line is pulled toward the flyer, the kite is caused to turn to the right. As long as the right control line remains in that position, the kite flys in a pattern resembling a clockwise circle. When the right line is returned to neutral, e.g., is the same length as the left control line, the clockwise pattern is terminated and the kite flies in a straight line. Similarly, in order to make the kite turn left, or fly in a counterclockwise circle, the left control line is pulled toward the flyer and held in such position.

With a little practice on the part of the flyer, the kite can be precisely controlled to fly in any desired pattern. For example, the kite can be made to fly in a horizontal plane relative to the ground, to fly in clockwise circles, counterclockwise circles, figure eights, clover-leaves and to dive towards the ground. In landing, the kite is caused to fly in a horizontal plane until its weight eventually causes the kite to gently contact the ground.

Although the preferred location of the attachment points 40 are described as being 10 percent above the center of gravity, from experience it has been found that when the points are moved upwardly, the kite will not fly as high and will be slower. Conversely, if the attachment points are moved downwardly, the kite pulls harder, flies faster and tends to stall. In addition, when relatively long tails are used the attachment points 40 may have to be moved slightly lower than the midpoint of the bridle. Conversely, the attachment points may have to be raised above the midpoint of the bridle when short tails are used.

Referring now to FIGS. 5–8, several alternative embodiments of the stunt kite in accordance with the present invention are illustrated. In each of the embodiments, the frame is comprised of four members (a horizontal spar, a vertical spline and diagonal spars), and bridles are connected at locations equidistant from the longitudinal axis of the kite between the horizontal spar and a respective diagonal spar such that the attachment point lies approximately 10 percent above the center of gravity.

Figure 5:
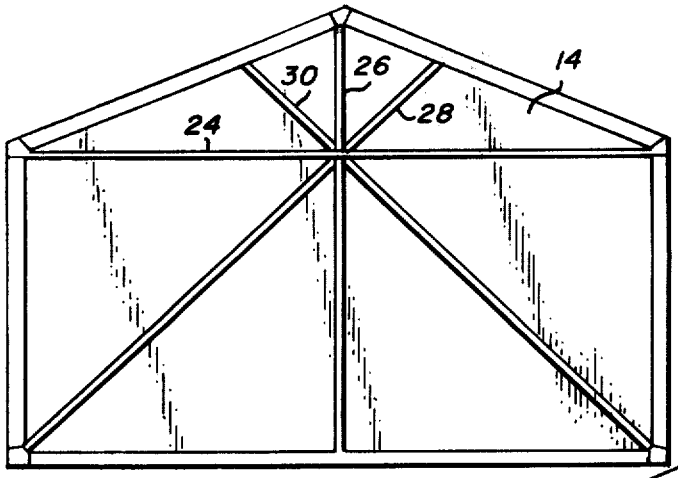
FIGS. 5–8 are rear elevation views diagrammatically illustrating several alternative embodiments in accordance with the present invention.
Figure 6:
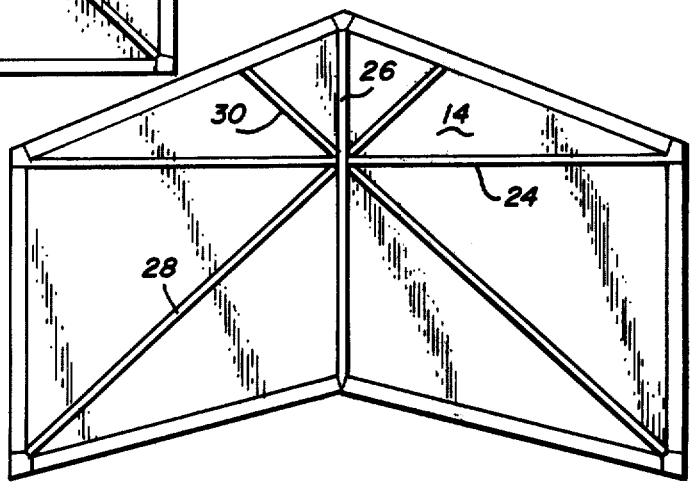
Figure 7:
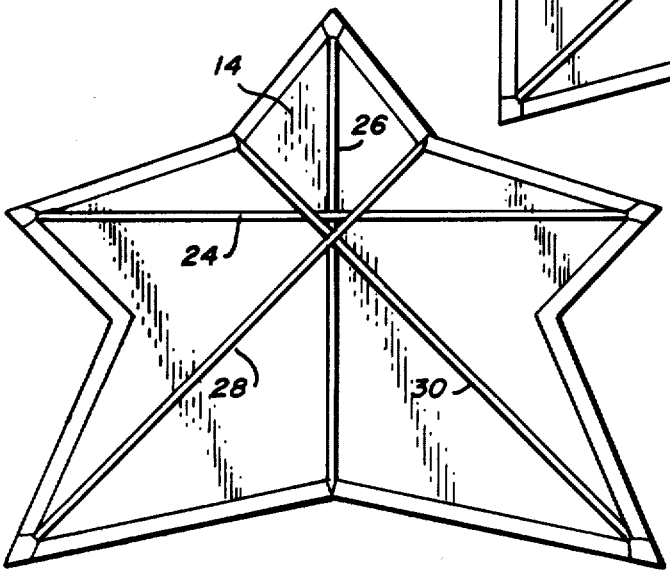
Figure 8:
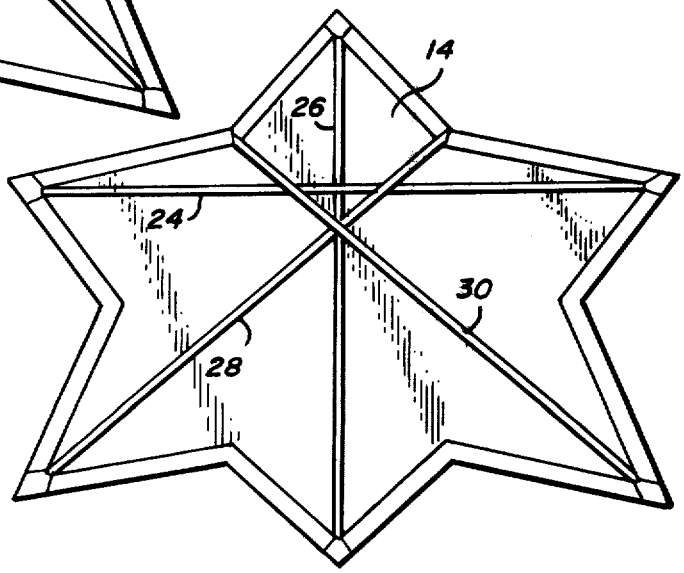

With reference to FIG. 5, the kite has a five-sided configuration and resembles a home plate as commonly used in baseball; in FIG. 6, the kite resembles a chevron with the bottom edges being substantially parallel to the respective top edges; in FIG. 7, the kite resembles a five-sided star; and in FIG. 8, the kite resembles a 6-sided star.

The terms "top" and "bottom" and words of similar import as used herein are intended to apply only to the position of the parts as illustrated in the drawing, since it is well known that kites of the general type illustrated may be flown or oriented in many positions during flight.

While there has been described what are at present considered to be the preferred embodiments of the invention, it will be understood that various modifications may be made therein, and it is intended to cover in the appended claims all such modifications as fall within the spirit and scope of the invention.

What is claimed is:

1. A stunt kite comprising:

a first spar member having first and second ends, a second spline member disposed substantially normal to said first member, and third and fourth spar members disposed diagonally relative to said first and second members and intersecting at said second member, said members being formed into a fixed frame;

a covering disposed on said frame and having an outer surface and a longitudinal axis in alignment with said second member, said outer surface being symmetrical in shape about said longitudinal axis and having a lateral dimension which is greater than its dimension corresponding to its longitudinal axis;

[means forming said first member into a bowed shape, such that said covering is bowed into a generally convex configuration;]

[a first bridle connected to] *bridle means consisting of a first and a second bridle, each bridle having only two connection points, said first bridle having one connection point on* said first member at a location intermediate said longitudinal axis and said first end and [to] *having another connection point below said first member on* said fourth member, said first bridle extending outside said outer surface and having a midpoint that lies above the center of gravity *and below said first member* of the kite and serves as an attachment point;

[a] *said* second bridle [connected to] *having one connection point on* said first member at a location intermediate said longitudinal axis and said second end and [to] *having another connection point below said first member on* said third member so as to be symmetrical about said longitudinal axis to said first bridle, said second bridle extending outside said outer surface and having a midpoint that lies above the center of gravity of the kite and serves as an attachment point; and tail means connected to said third and fourth members proximate the respective bottom ends thereof for providing substantially equal stabilizing drag forces at the bottom corners of said covering, such that when lengths of line are connected to said attachment points the flight pattern of the kite is capable of being precisely controlled.

2. A stunt kite as recited in claim 1 wherein said members intersect at a point and further including means for affixing said members together at said point.

3. A stunt kite as recited in claim 1 wherein said covering comprises a six-sided shape having parallel side edges and top and bottom edges that generally resemble a blunt home plate.

4. A stunt kite as recited in claim 1 wherein said covering comprises a five-sided shape that generally resembles a home plate.

5. A stunt kite as recited in claim 1 wherein said covering comprises a six-sided shape having parallel side edges that generally resembles a chevron.

6. A stunt kite as recited in claim 1 wherein said covering comprises a ten-sided shape that generally resembles a five-pointed star.

7. A stunt kite as recited in claim 1 wherein said covering comprises a twelve-sided shape that generally resembles a six-pointed star.

8. A stunt kite as recited in claim 1 and further comprising first and second control lines connected to said respective attachment points, said control lines each having an equal length, said lengths being capable of being relatively changed, whereby when said lengths are changed, the flight pattern of the kite is capable of being precisely controlled.

9. A stunt kite as recited in claim 8 and further comprising a plurality of snap swivels for connecting said first and second control lines to said attachment points and said tail means to said third and fourth members.

10. A stunt kite as recited in claim 1 wherein said tail means includes a first elongated sheet of material connected to the bottom end of said third member, and a second elongated sheet of material, identical to said first sheet, connected to the bottom end of said fourth member, said first and second sheets providing substantially equal stabilizing drag forces at the bottom corners of said covering.

[11. A stunt kite as recited in claim 10 wherein each said first and second sheets are comprised of an upper portion having a first constant lateral dimension, a lower portion having a second constant lateral dimension that is less than said first dimension, and a midportion interconnecting said upper and lower portion having a lateral dimension that is tapered from said first dimension to said second dimension.]

12. A stunt kite as recited in claim 1 wherein said covering includes first and second apertures disposed on opposed sides of said longitudinal axis on a first imaginary line coinciding with the position of said first member, and third and fourth apertures disposed on a second imaginary line parallel to said first line and coinciding with the intersection of said respective fourth and third members and lines perpendicular to said first line at said first and second apertures, said apertures permitting said bridles to be connected to said members while extending outside said outer surface.

*13. A stunt kite as recited in claim 1 and further comprising means forming said first member into a bowed shape, such that said covering is bowed into a generally convex configuration.*

*14. A stunt kite comprising:*

*a first spar member having first and second ends, a second spline member disposed substantially normal to said first member, and third and fourth spar members disposed diagonally relative to said first and second members and intersecting at said second member, said members being formed into a fixed frame,*

*a covering disposed on said frame and having an outer surface and a longitudinal axis in alignment with said second member, said outer surface being symmetrical in shape about said longitudinal axis and having a lateral dimension which is greater than its dimension corresponding to its longitudinal axis,*

*a first bridle connected to said first member at a location intermediate said longitudinal axis and said first end and to said fourth member, said first bridle extending outside said outer surface and having a midpoint that lies above the center of gravity of the kite and serves as an attachment point;*

*a second bridle connected to said first member at a location intermediate said longitudinal axis and said second end and to said third member so as to be symmetrical about said longitudinal axis to said first bridle, said second bridle extending outside said outer surface and having a midpoint that lies above the center of gravity of the kite and serves as an attachment point; and*

*tail means including a first elongated sheet of material connected to the bottom end of said third member, and a second elongated sheet of material, identical to said first sheet, connected to the bottom end of said fourth member, each said first and second sheets being comprised of an upper portion having a first constant lateral dimension, a lower portion having a second constant lateral dimension that is less than said first dimension, and a midportion interconnecting said upper and lower portion having a lateral dimension that is tapered from said first dimension to said second dimension, said first and second sheets providing substantially equal stabilizing drag forces at the bottom corners of said covering, such that when lengths of line are connected to said attachment points the flight pattern of the kite is capable of being precisely controlled.*

* * * * *